(12) United States Patent
Doing et al.

(10) Patent No.: US 7,779,232 B2
(45) Date of Patent: Aug. 17, 2010

(54) METHOD AND APPARATUS FOR DYNAMICALLY MANAGING INSTRUCTION BUFFER DEPTHS FOR NON-PREDICTED BRANCHES

(75) Inventors: Richard W. Doing, Raleigh, NC (US); Michael O. Klett, Raleigh, NC (US); Kevin N. Magill, Raleigh, NC (US); Brian R. Mestan, Austin, TX (US); David Mui, Round Rock, TX (US); Balaram Sinharoy, Poughkeepsie, NY (US); Jeffrey R. Summers, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 11/845,838

(22) Filed: Aug. 28, 2007

(65) Prior Publication Data

US 2009/0063819 A1  Mar. 5, 2009

(51) Int. Cl.
*G06F 9/42* (2006.01)
*G06F 9/312* (2006.01)
(52) U.S. Cl. .................................... 712/207
(58) Field of Classification Search ............. None
See application file for complete search history.

(56) References Cited

U.S. PATENT DOCUMENTS 5,870,599 A * 2/1999 Hinton et al. ............. 712/239
5,881,278 A * 3/1999 Tran et al. ................ 712/242
5,918,046 A * 6/1999 Hoyt et al. ............... 712/239
5,935,241 A * 8/1999 Shiell et al. .............. 712/240
6,766,441 B2 * 7/2004 Sinharoy ................. 712/237
7,124,287 B2 * 10/2006 Prasky et al. ............. 712/238
2005/0216714 A1 * 9/2005 Grochowski ............. 712/240

OTHER PUBLICATIONS

U.S. Appl. No. 11/039,498, filed Jan. 20, 2005, Eisen, et al.

* cited by examiner

*Primary Examiner*—Eric Coleman
(74) *Attorney, Agent, or Firm*—Mitch Harris, Atty at Law, LLC; Andrew M. Harris; Diana R. Gerhardt

(57) ABSTRACT

A method and apparatus for dynamically managing instruction buffer depths for non-predicted branches reduces wasted energy and resources associated with low confidence branch prediction conditions. A portion of the instruction buffer for a instruction thread is allocated for storing predicted branch instruction streams and another portion, which may be zero-sized during high prediction confidence conditions, is allocated to the non-predicted branch instruction stream. The size of the buffers is adjusted dynamically in conformity with an on-going prediction confidence that provides a measure of how well branch prediction mechanisms are working for a given instruction thread. An alternate instruction fetch address table can be maintained and multiplexed with the main fetch address register for addressing the instruction cache, so that the instruction stream can be quickly shifted to the non-predicted path when a branch instruction is resolved to the non-predicted path.

20 Claims, 5 Drawing Sheets

METHOD AND APPARATUS FOR DYNAMICALLY MANAGING INSTRUCTION BUFFER DEPTHS FOR NON-PREDICTED BRANCHES

BACKGROUND OF THE INVENTION

1. Technical Field

The present invention relates generally to processors and computing systems, and more particularly, to a processor having branch prediction mechanisms, in which the depth of instruction buffers for predicted and non-predicted branches are dynamically adjusted.

2. Description of the Related Art

Present-day high-performance microprocessors include an instruction fetch unit (IFU) that fetches, decodes and dispatches instructions for execution by other processor core functional units. Instruction streams are sequentially fetched until execution is re-directed. A common example of such re-direction is a branch instruction. The branch may be "taken", which causes a non-sequential fetch, or "not taken", in which instruction fetching continues past the branch instruction. In a branch-predicting processor, instruction streams are pre-fetched according to a prediction of whether a branch will be "taken" or "not taken". Various mechanisms have been used to determine whether a branch will be taken to ensure that the correct path is fetched. When a branch instruction is predicted as "taken", the current instruction fetch path is re-directed to a new target address, and the instruction fetching proceeds linearly from the new target address. When the branch instruction is predicted as "not taken", the instruction fetching is not redirected.

As instructions are fetched, they are typically stored in an instruction buffer (IB). Instructions are then removed from the IB, decoded and then sent to an instruction dispatch unit (IDU), which dispatches the instructions for execution by various functional units within the processor. When a branch instruction is executed, a branch processing unit (BU) determines whether or not the branch path was predicted correctly, and if the prediction was correct, no interruption in instruction sequence occurs. However, if the branch was mis-predicted, the current fetch path must be abandoned and the sequence of execution re-directed to the non-predicted branch path. Several penalties are incurred, including the time required to redirect the instruction sequence, the time required to flush the mis-predicted entries, and the power and thread resources wasted on fetching and preparing to execute the instructions on the mis-predicted path.

The amount of resources and processing power wasted on mis-prediction can be reduced by disabling predictive execution and stalling the pipeline pending resolution of each branch instruction. However, such behavior negates the advantage provided by branch prediction, that of providing a full instruction pipeline for full processor performance, with the pipeline being correctly filled most of the time.

It is therefore desirable to provide a methodology and a microprocessor that reduce the amount of resources and energy wasted on branch mis-prediction, while keeping the instruction pipeline full for full processing performance.

SUMMARY OF THE INVENTION

The objective of providing a processor that reduces resources and energy wasted on branch mis-prediction, while retaining the advantages of branch-predicting instruction pre-fetch is provided in a processor and method of operation of the processor.

The processor includes a control unit that measures the quality of branch predictions for a given instruction thread, and dynamically adjusts the sizes of instruction buffer portions that store both the predicted branch and the non-predicted branch instruction streams. The buffer portion sizes are adjusted in conformity with a measured branch prediction confidence, so that when the branch prediction confidence for a given instruction thread is high, the buffer portion for the non-predicted instruction stream is lowered and can be set to zero under high confidence conditions. The relative sizes of the buffer portions can be dynamically varied for individual threads in a multi-threaded environment, so that for threads encountering low branch-prediction confidence intervals, more buffer space is allocated for non-predicted branch path.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention concerns methodologies and processor circuits that provide buffering for both predicted and non-predicted instruction streams for branch instruction paths. In the present invention, the buffer size for the predicted and non-predicted instruction paths is dynamically varied in conformity with a measurement of the confidence in the branch predictions. The confidence measurement may be made in a number of ways, but generally provide a measurement of the correct predictions versus the incorrect predictions made by the branch prediction circuits.

Figure 1:
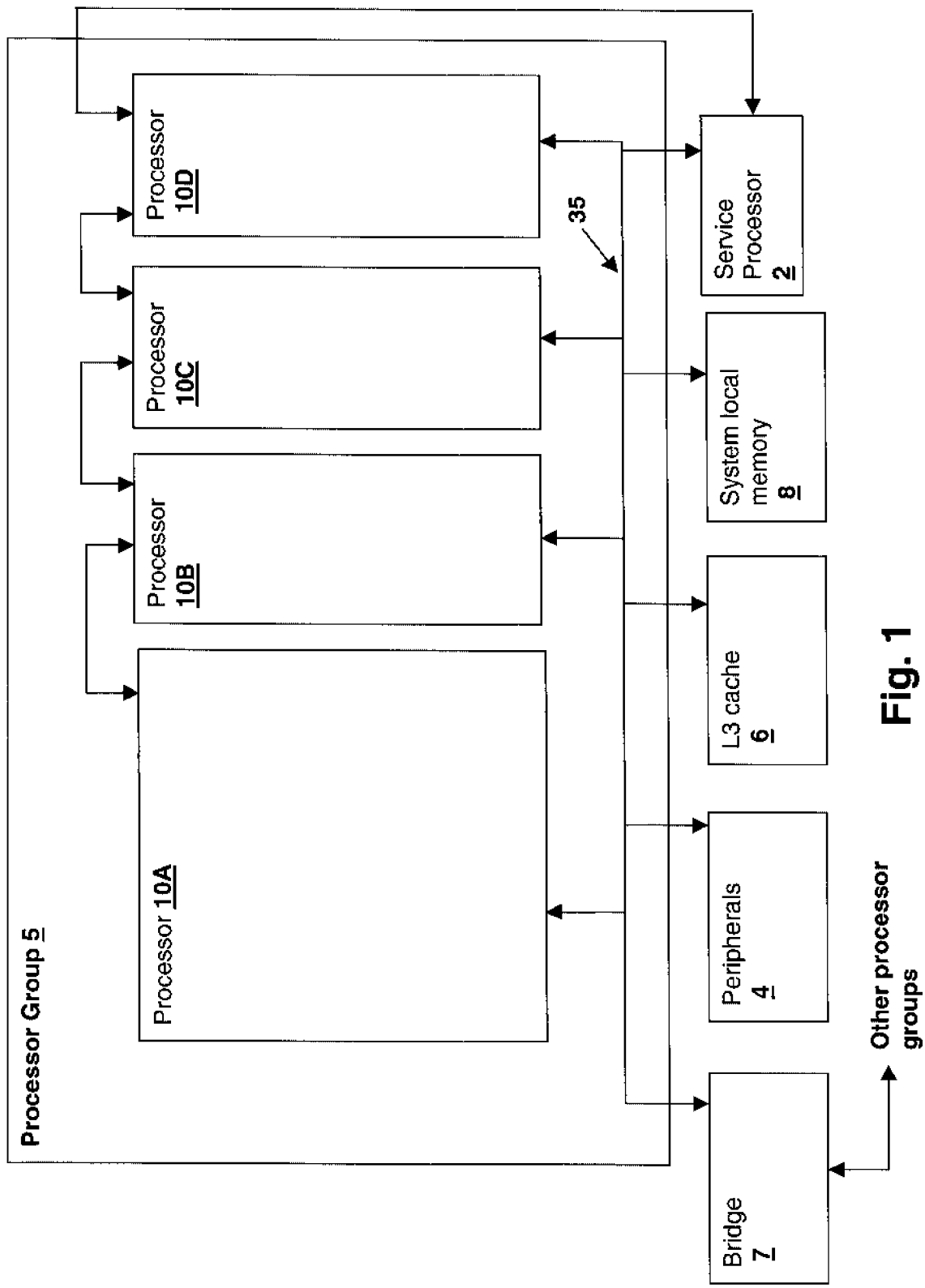
FIG. 1 is a block diagram of a system in accordance with an embodiment of the invention.

With reference now to the figures, and in particular with reference to FIG. 1, there is depicted a block diagram of a system in accordance with an embodiment of the present invention. The system includes a processor group 5 including multiple multi-threaded processors 10A-D that may be connected to other processor groups via a bridge 7 to form a large scalable processing system. The present invention may be practiced within a single processor that supports simultaneous multi-threading, a single-threaded processor, or in multiple processors within a large-scale system, such as that illustrated in FIG. 1. The present invention provides improved performance by dynamically allocating space to non-predicted instruction streams that follow branch instructions. The amount of space allocated for non-predicted instruction streams is varied according to a branch prediction metric that indicates branch prediction confidence.

Processor group 5 is connected to an L3 cache unit 6, system local memory 8 and various peripherals 4, as well as to a service processor 2. Service processor 2 can provide fault supervision, startup assistance and test capability to processor group 5 and may have a dedicated interconnect path to other processor groups as well as interconnecting to each of processors 10A-D. Processors 10A-D provide instruction execution and operation on data values for general-purpose processing functions. Bridge 7, as well as other bridges within the system provide communication over wide buses with other processor groups and bus 35 provides connection of processors 10A-D, bridge 7, peripherals 4, L3 cache 6 and system local memory 8. Other global system memory may be coupled external to bridge 7 for access by all processor groups.

Processors 10A-D are simultaneous multi-threaded (SMT) processors capable of concurrent and speculative execution of multiple threads. Each of processors 10A-D includes execution resources to support multiple streams of simultaneous execution, i.e. multiple instruction threads and further includes control circuitry (hardware) that determines the quality of branch prediction for each instruction thread, and alters the size of instruction buffers provided for non-predicted instruction streams upon determining that branch prediction for that instruction thread is not proceeding efficiently.

Figure 2:
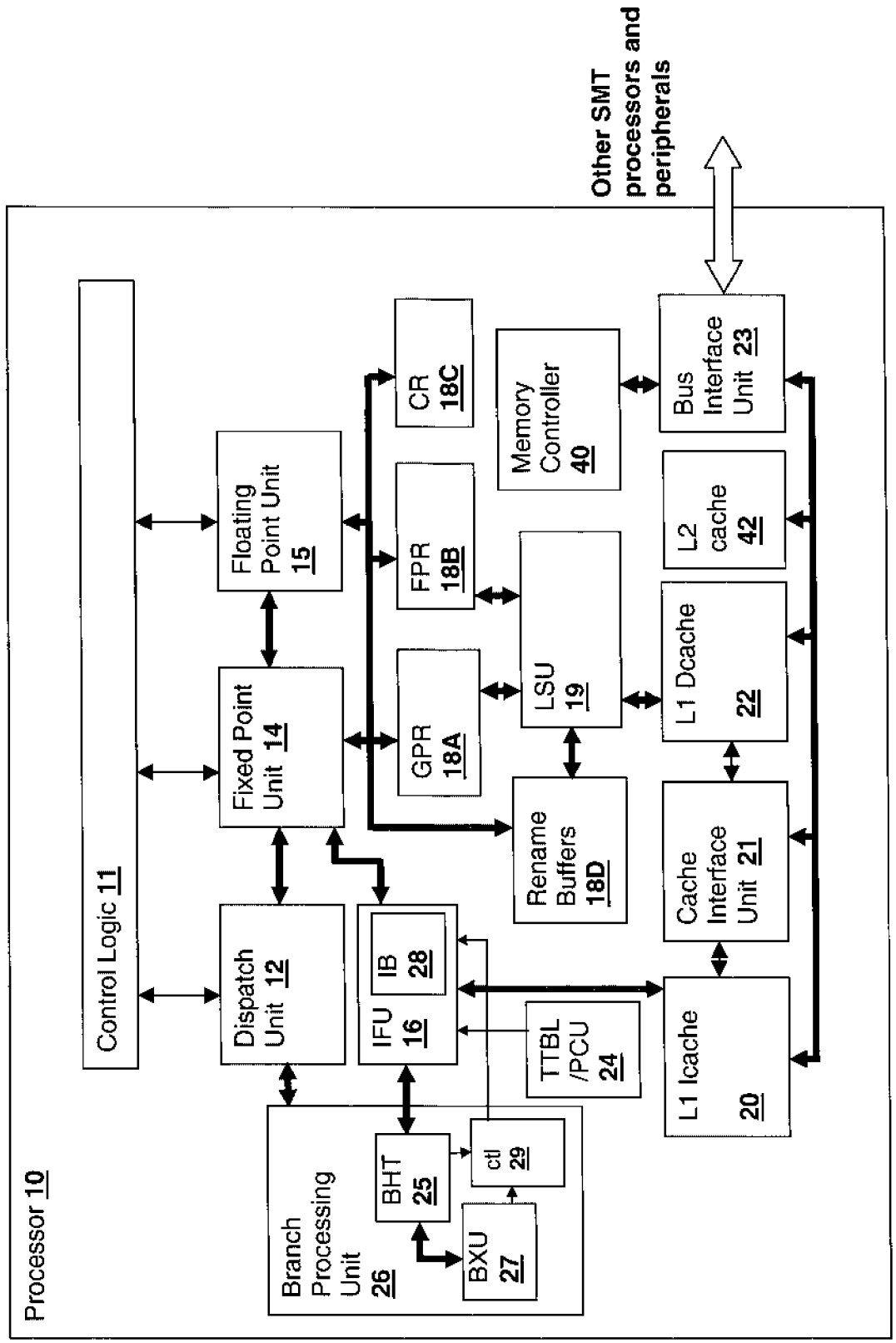
FIG. 2 is a block diagram of a processor 10 in accordance with an embodiment of the invention.

Referring now to FIG. 2, details of a processor 10 having features identical to processors 10A-D are depicted. A bus interface unit 23 connects processor 10 to other SMT processors and peripherals and connects L2 cache 42, L1 Dcache 22 for storing data values, L1 Icache 20 for storing program instructions and cache interface unit 21 to external memory, processors and other devices. L1 Icache 20 provides loading of instruction streams in conjunction with instruction fetch unit IFU 16, which fetches instructions and include storage for instruction streams in an instruction buffer (IB) 28. A dispatch unit 12 controls sequencing of instructions issued to various internal units such as a fixed point unit (FXU) 14 for executing general operations and a floating point unit (FPU) 15 for executing floating point operations.

Fixed point unit 14 and floating point unit 15 are coupled to various resources such as general-purpose registers (GPR) 18A, floating point registers (FPR) 18B, condition registers (CR) 18C and rename buffers 18D. GPR 18A and FPR 18B provide data value storage for data values loaded and stored from L1 Dcache 22 by load store unit (LSU) 19. Rename buffers 18D (which may comprise several rename units associated with the various internal execution units) provides operand and result storage for the execution units. IFU 16 receives direction from a program control unit/thread table unit (TTBL/PCU) 24 that contains settings for managing thread execution, such as thread priority and per-thread control information so that IFU 16 can be directed to load an instruction sequence that represents the allocation of execution resources among the multiple instruction threads executing within processor 10. TTBL/PCU 24 is responsible for determining which instruction thread(s) receives the most processing cycles, instruction fetch cycles and/or execution time slices, depending on what particular method is used to sequence the instructions between threads.

The instruction execution pipelines of present-day superscalar processors such as processor 10 are very deep (for example, 25 or more clock cycles may be required for an instruction to clear the pipeline), and for simplicity, resolution of branch conditions has generally been handled very late in the pipeline, when the condition register value upon which the branch instruction depends is assured to be in the resolved state. In addition, there is generally a finite and significant physical and electrical distance between the branch prediction unit and the unit resolving the branch condition. Therefore, even if the branch condition is actually known at the time a conditional branch is decoded, branch processing unit 26 generally still predicts the outcome of the branch using branch history table 25 and dispatches the instructions following the predicted path of the branch speculatively. If a branch prediction is incorrect, the pipeline resources allocated for the predicted instruction stream must be flushed, and all of the power and resources associated with the incorrectly predicted branch path that was loaded into the pipeline are wasted. In the present invention, the wasted resources and power are reduced for branches for which prediction has a low confidence, e.g., those branches for which the "branch taken" and "branch not-taken" probabilities both approach 50%. The reduction in power consumption and resource conservation occurs because the instructions fetched ahead of a predicted taken branch, which would ordinarily be flushed due to the predicted instruction fetch path redirection, are instead retained. The retained non-predicted instruction path prevents the instruction fetch mechanism from being held up when a mis-predict occurs for the predicted taken branch.

For the above purpose, IFU 16 receives input from control logic 29 within branch processing unit 26. A branch execution unit (BXU) 27 within branch processing unit 26 manages execution of instruction groups associated with branch instructions. A branch history table (BHT) 25 stores information about each branch instruction encountered (within a limit of storage of the table, which is content-addressed by a subset of bits from the branch address), and further stores information used by BXU 27 to decide which path is predicted as the likely path for a branch instruction. Each entry in BHT 25 includes bits that indicate for each branch, a relative confidence and direction of likely execution for each branch. BHT 25 is updated as to the direction and strength of actual taken branch paths at the time of execution of the branch instructions. The present invention uses BHT 25 information to inform control logic 29 to control the relative sizes of instruction buffer portions in IB 28 in conformity with the quality of branch prediction for that branch instruction and instruction thread.

Figure 3:
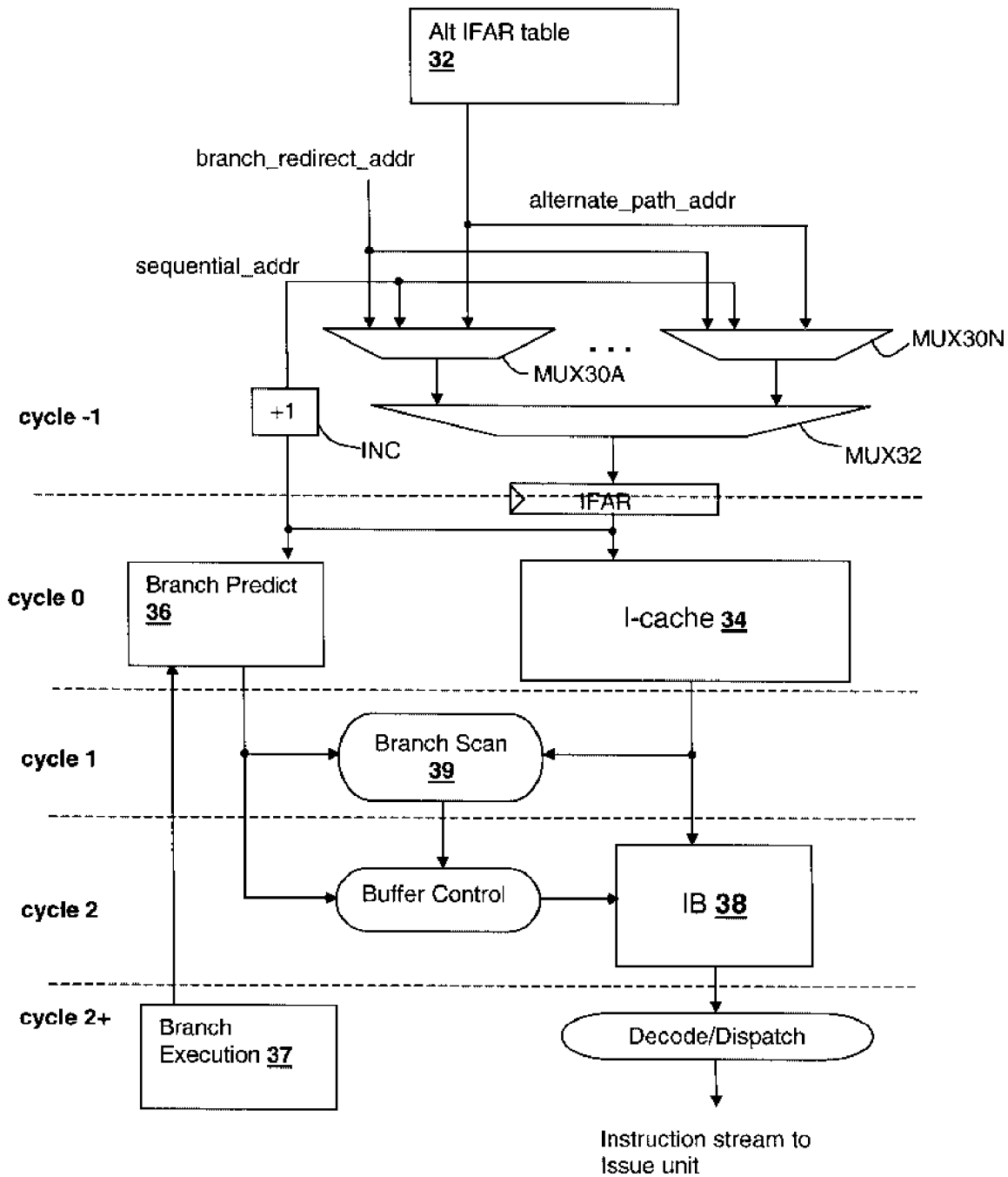
FIG. 3 is a pictorial diagram depicting processor pipeline instruction flow within a processor in accordance with an embodiment of the present invention.

Referring now to FIG. 3, processor instruction pipeline flow within a processor are shown that support the method and provide an illustration of the apparatus of an embodiment of the present invention. The instructions for each instruction thread are fetched from an instruction cache (I-cache) 34, where they have been loaded for all executing threads, for example, instructions loaded into L1 Icache 20 by cache interface unit 21 in FIG. 2. The address used to select instructions from I-cache 34 is provided by an instruction fetch address register (IFAR). In pipeline cycle cycle-1, multiplexer MUX32 selects between addresses for each of a number of executing threads according to the thread execution sequence, and the individual addresses for each thread are provided from multiplexers MUX30A-MUX30N, which select between a next (sequential) address generated by incrementer INC sequential_addr, a redirected address due to a branch branch_redirect_addr, or an address provided for an alternate path address alternate_path_addr provided from an alternate IFAR table 32. The alternate path address alternate_path_addr is the address of a next instruction following the last instruction of the non-predicted branch path instruction stream corresponding to the portion of IB 38 allocated for that instruction thread to store the non-predicted branch path. The main portion of IB 38 is used to store instructions fetched along a sequential path or the predicted branch path, and the selection of alternate path instructions is determined after the branch instruction has been executed.

In pipeline cycle cycle 0, the address from instruction fetch address register IFAR is used to access I-cache 34 and branch prediction structures such as branch history tables 36. The branch prediction information and instruction retrieved from I-cache is latched and used in the following pipeline cycle cycle 1. In pipeline cycle cycle 1, branch scan logic 39 determines whether the instruction is a branch, and if so, whether the branch is taken or not taken. In the next cycle cycle 2, instructions are stored in instruction buffer (IB) 38. If the branch prediction for a predicted taken branch has low confidence, the alternate path instructions are also stored in instruction buffer 38, since the alternate path instructions are the sequential instructions following the branch instruction. The alternate path address is calculated and sent to alternate fetch address register table 32. The alternate path address will either be the predicted taken address or the next sequential address, which are already stored and therefore only a selection between the two addresses is required. If the branch is a low confidence predicted not taken branch, then the branch destination address is loaded into alternate IFAR table 32, so that the alternate path can be fetched when idle cycles are available.

In subsequent cycles cycle 2+, the alternate (non-predicted) path is stored along with the main (predicted) branch path, until another branch instruction is detected, the portion of IB 38 allocated for the alternate path is full, or a limit on instruction look-ahead for alternate path fetching is met. At the end of an alternate path fetch group, the next address is written into the alternate IFAR table 32. Also, concurrently with subsequent instruction fetching, instructions are decoded and dispatched to the issue unit(s). Once a branch instruction is resolved, if the branch was not mis-predicted, the alternate path portion of instruction buffer 38 for the instruction thread is flushed. If the branch instruction was mis-predicted, then the portion of IB 38 that contains the main path instructions is flushed, and instructions are retrieved from the alternate path buffer until the buffer is empty. Concurrently, the alternate IFAR table 32 is used to fetch the alternate path instructions into the main portion of IB 38, which improves performance by greatly reducing the mis-predict penalty. Once the alternate path buffer is emptied, the instructions are retrieved from the main path portion of instruction buffer 38.

After each branch instruction is resolved by branch execution logic 37, the branch history and confidence values are updated and the buffer portion sizes are adjusted in conformity with the updated confidence values. The instruction buffer portion sizes can either be dynamically adjusted for each next branch instruction for an instruction thread in conformity with a branch prediction confidence for the particular branch instruction (fine granularity) or adjusted in conformity with an overall branch prediction confidence for the instruction thread. The invention, in particular, provides a large degree of improvement for predicted taken branches that are mis-predicted. For the predicted taken branch case, the non-predicted path sequentially follows the branch instruction and the alternate instruction fetch buffers can be filled while the IFAR is redirected to the new branch target address. By including an address table and previously fetched values for the not-taken branch path, pipeline stalls due to branch mis-predictions can be more easily avoided or greatly reduced.

The amount of space allocated for the non-predicted path, relative to the predicted path buffer size, is generally set to a value between 0% and 50%, depending on the branch prediction confidence, since any value greater than 50% would limit the space allocated for the instructions more likely to be used. Additionally the technique can be disabled entirely for instruction threads in which the branch prediction confidence exceeds a predetermined threshold, e.g., 90%, where the resources used to fetch the non-predicted path instructions yield a negative result due to cached arbitration and other overhead, along with the additional power consumed in fetching the non-predicted branch path.

Figure 4A:
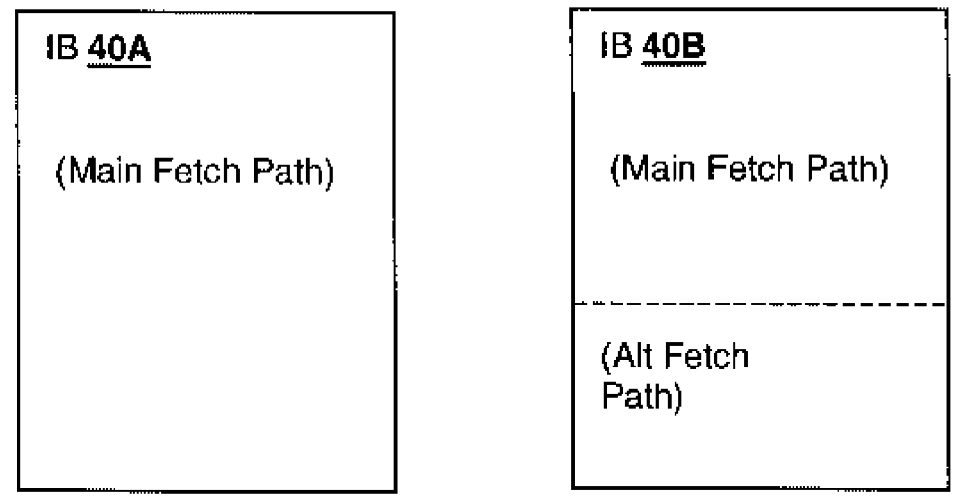
FIGS. 4A and 4B are pictorial diagrams showing exemplary instruction buffer allocations within processor 10 of FIG. 2.
Figure 4B:
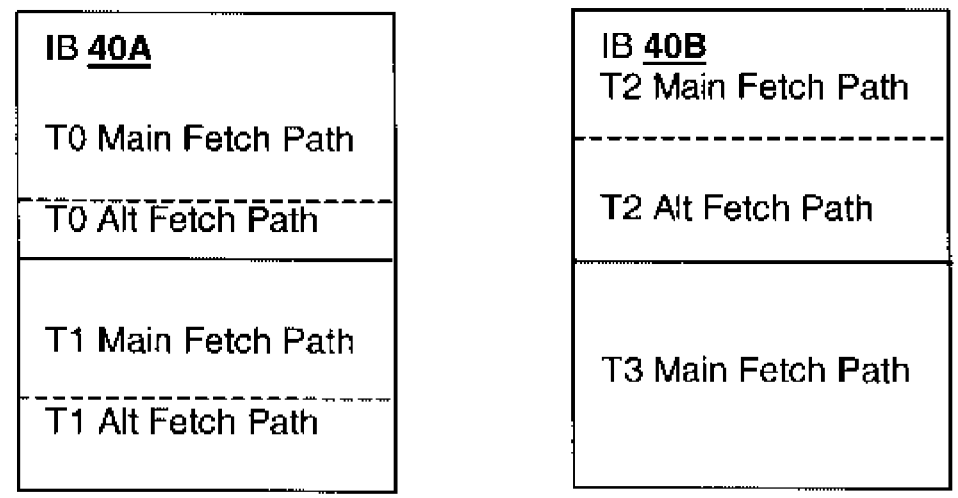
Figure 5:
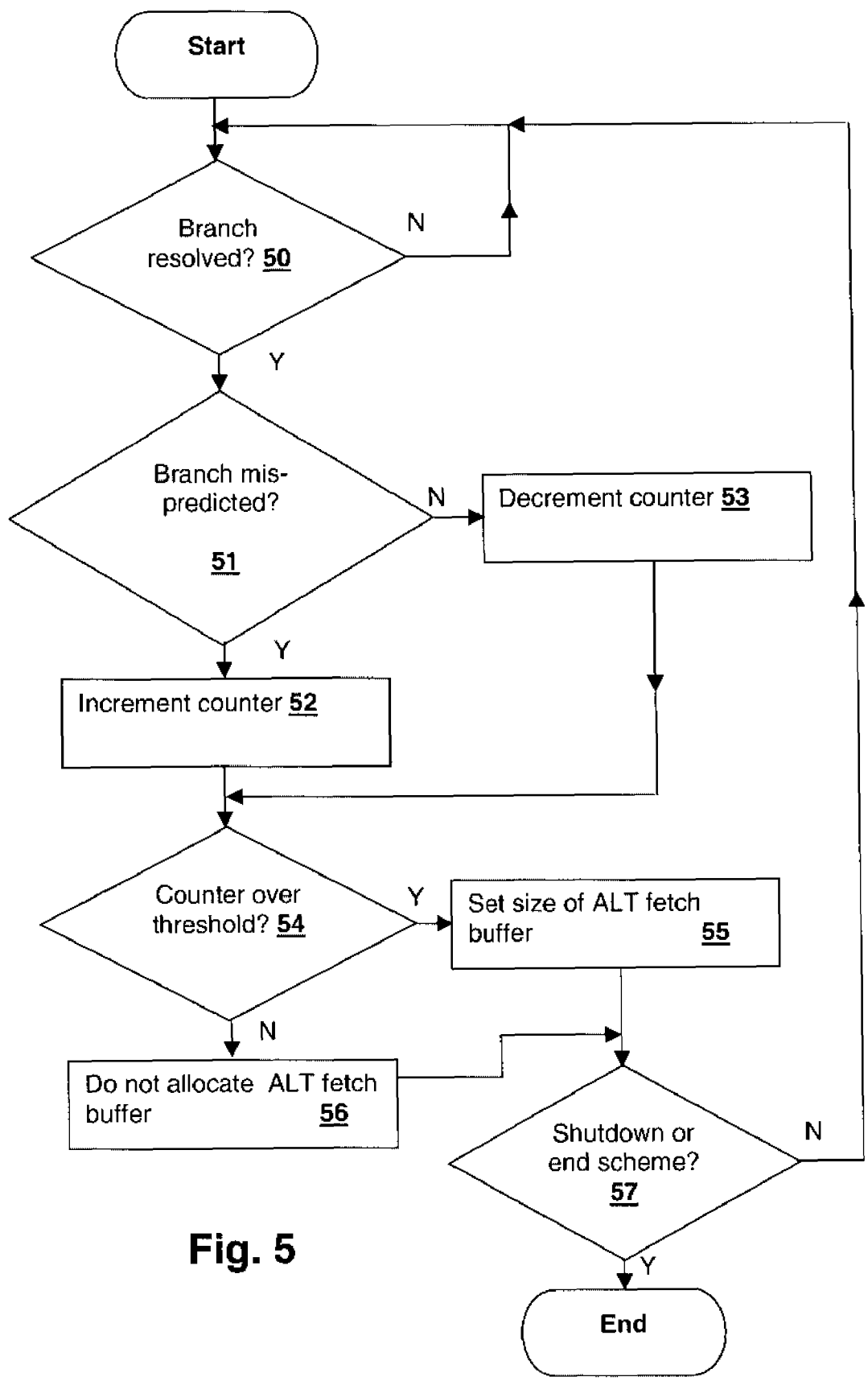
FIG. 5 is a flowchart depicting a method in accordance with an embodiment of the present invention.

Referring now to FIG. 4A, an instruction buffer allocation is shown in accordance with an embodiment of the invention, for single-threaded mode. The overall instruction buffer comprises two buffers IB 40A and IB 40B, which are both used to store instructions for the single executing thread. As shown, all of IB 40A is used to store instructions for the main fetch path, and IB 40B is allocated between the main fetch path and the alternate (non-predicted branch) fetch path. As shown, the allocation for the alternate fetch path is approximately 15%, which might correspond to a branch confidence level of 70%, if a linear allocation between 0% and 50% is used for the alternate fetch path according a the branch confidence between zero and one. FIG. 4B shows an allocation within the same processor for four executing threads having differing degrees of confidence with respect to the next branch instruction. In the example, thread T3 has high branch prediction confidence, so all of thread T3's portion of IB 40B is allocated to the main fetch path. Thread T2 has low branch prediction confidence, and therefore the main and alternate fetch paths receive equal buffer portion sizes. Threads T0 and T1 have branch prediction confidences higher than that of thread T2, but not above the threshold that disables buffer allocation for the alternate path.

Referring now to FIG. 4, a method for managing thread execution resources in accordance with an embodiment of the invention operating within processor 10 is depicted in a flow chart. At each resolution of a branch (step 50) if the branch is determined to be mispredicted (step 51), i.e., the previous prediction using the branch history table does not match the actual outcome, then a low branch confidence counter is incremented (step 52), otherwise the counter is decremented (step 53). If the count is over a threshold (decision 54) then the size of the alternate path fetch buffer is set according to the count/confidence (step 55), otherwise if the count is not over the threshold (decision 54) the alternate fetch buffer is not allocated (step 56). Initially, the main fetch path is allocated all of the instruction buffer space, so that the alternate buffer space is effectively zero. Once the threshold has been exceeded, alternate path buffer space is allocated and the alternate path buffer size is changed dynamically. The branch prediction quality will have to rise above or fall below another threshold in order to change the relative size of the instruction buffer portions, providing a dead-band so that the instruction buffer portion are prevented from re-sizing too frequently. The process continues until the scheme is ended or the system is shut down (decision 57).

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method for managing instruction buffer resources in a processor of a computer system, comprising:
   storing a first instruction stream corresponding to a more likely path of a branch instruction in a first portion of an instruction buffer;
   storing a second instruction stream corresponding to a less likely path of the branch instruction in a second portion of the instruction buffer;
   within a control circuit responsive to a branch prediction unit of the processor, calculating a measure of branch prediction confidence for a instruction thread; and
   from a control circuit within the processor that is responsive to the calculated measure of branch prediction confidence, setting a size of the first portion of the instruction buffer and setting a size of the second portion of the instruction buffer in conformity with the measure of branch prediction accuracy.

2. The method of claim 1, further comprising determining whether the measure of branch prediction accuracy is above a predetermined threshold, and wherein the setting sets the size of the instruction buffer resources allocated for the non-predicted branch to zero in response to determining that the measure of branch prediction accuracy is above the predetermined threshold.

3. The method of claim 1, further comprising repeating said calculating and setting for an instruction thread executed by said processor, whereby a size of the second portion of the instruction buffer resources is adjusted dynamically in conformity as said measure of branch prediction accuracy changes.

4. The method of claim 1, wherein the processor is executing instructions for multiple instruction threads, and wherein the setting allocates the storage in the instruction buffer in multiple partitions, each corresponding to one of the multiple instruction threads, between first and second portions in the multiple partitions, in conformity with the measure of branch prediction accuracy for each corresponding thread.

5. The method of claim 1, wherein the calculating calculates the measure of branch prediction confidence for the instruction thread for each branch instruction, and wherein the setting sets the size of the first and second portions of the instruction buffer resource in conformity with the measure of branch prediction accuracy for a next branch instruction.

6. The method of claim 1, wherein the calculating calculates a measure of average branch prediction confidence for the instruction thread over multiple branch instructions, and wherein the setting sets the size of the first and second portions of the instruction buffer resource in conformity with the measure of average branch prediction accuracy.

7. The method of claim 1, further comprising:
   storing an alternate fetch address corresponding to the non-predicted path;
   resolving a taken path of a branch instruction; and
   retrieving instructions from the second portion according to the alternate fetch address if the branch instruction is mis-predicted.

8. The method of claim 7, wherein the retrieving instructions retrieves instructions from the first portion after a number of stored instructions for the non-predicted branch is exhausted.

9. A processor, comprising:
   functional execution blocks for executing program instructions, including a branch execution unit for executing branch instructions;
   an instruction buffer;
   an instruction fetch unit for loading the program instructions into the instruction buffer;
   a branch processing unit for determining that a branch instruction has been encountered, determining a more likely path of the branch instruction, and indicating to the instruction fetch unit to load a first instruction stream corresponding to the more likely path in a first portion of the instruction buffer and a second instruction stream corresponding to a less likely path in a second portion of the instruction buffer; and
   a control circuit coupled to the branch processing unit for measuring a confidence of the determining by the branch processing unit, and adjusting a size of the first portion and the second portion in conformity with a result of the measuring.

10. The processor of claim 9, wherein the control circuit sets the size of the second portion to zero, wherein the branch processing unit does not load any instructions for the second instruction stream, in response to the control unit measuring a confidence that is above a predetermined threshold.

11. The processor of claim 9, wherein the control circuit repeatedly measures the confidence and adjusts the size of the second portion of the instruction buffer for an instruction thread executed by said processor, whereby a size of the second portion of the instruction buffer resources is adjusted dynamically in conformity as said measure of branch prediction accuracy changes.

12. The processor of claim 9, wherein the program instructions are program instructions for multiple instruction threads, and wherein the control circuit allocates the storage in the instruction buffer in multiple partitions, each corresponding to one of the multiple instruction threads, between first and second portions in the multiple partitions, in conformity with the measure of branch prediction accuracy for each corresponding instruction thread.

13. The processor of claim 9, wherein the control circuit calculates the measure of branch prediction confidence for the instruction thread for each branch instruction, and further sets the size of the first and second portions of the instruction buffer in conformity with the measure of branch prediction accuracy for a next branch instruction.

14. The processor of claim 9, wherein the control circuit calculates a measure of average branch prediction confidence for the instruction thread over multiple branch instructions, and further sets the size of the first and second portions of the instruction buffer in conformity with the measure of average branch prediction accuracy.

15. The processor of claim 9, further comprising:
   an instruction fetch address register for providing a sequential address into an instruction cache for fetching instructions of the more likely path;
   an alternate instruction fetch address table for storing an alternate address into an instruction cache corresponding to the non-predicted path;
   a selection circuit for loading the alternate address into the instruction fetch address register in response to the control logic determining that the branch instruction resolved to the less likely path.

16. The processor of claim 15, wherein the instruction fetch unit retrieves instructions from the first portion after a number of stored instructions for the non-predicted branch is exhausted.

17. An instruction fetch circuit for a processor pipeline, comprising:
   an instruction fetch address register for providing a next instruction fetch address to an instruction cache;

an alternate instruction fetch address table, for storing an address of a non-predicted branch path;
a branch evaluation circuit;
a selector for selecting between an output of the instruction fetch address register and the alternate fetch address table, wherein the selector is operated in response to a resolution of a branch instruction by the branch evaluation circuit, whereby the next instruction fetch address is redirected to the non-predicted branch path if the resolution of the branch instruction indicates that the non-predicted branch is taken.

18. The instruction fetch circuit of claim 17, wherein the selector comprises a plurality of selectors, one for each of a set of multiple instruction threads, and further comprising a second selector for selecting among the outputs of the plurality of selectors to provide a next value to the instruction fetch address register.

19. The instruction fetch circuit of claim 17, further comprising a branch prediction unit for providing an indication of a likely path of the branch instruction, and wherein the alternate instruction fetch address table is populated according to an output of the branch prediction unit.

20. The instruction fetch circuit of claim 19, further comprising an instruction buffer indexed by the instruction fetch address register and having two buffer portions, one corresponding to a predicted branch path and one corresponding to the non-predicted branch path, and wherein the relative size of the two buffer portions is set in conformity with a measure of confidence in the indication provided by the branch prediction unit.

* * * * *